United States Patent
Akimoto et al.

(10) Patent No.: US 11,236,782 B2
(45) Date of Patent: Feb. 1, 2022

(54) ROLLING BEARING

(71) Applicant: JTEKT CORPORATION, Osaka (JP)

(72) Inventors: Shota Akimoto, Osaka (JP); Yuya Yamamoto, Osaka (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 17/223,578

(22) Filed: Apr. 6, 2021

(65) Prior Publication Data

US 2021/0317875 A1 Oct. 14, 2021

(30) Foreign Application Priority Data

Apr. 13, 2020 (JP) .............................. JP2020-071536

(51) Int. Cl.
*F16C 19/06* (2006.01)
*F16C 33/41* (2006.01)
*F16C 33/38* (2006.01)

(52) U.S. Cl.
CPC .......... *F16C 33/3887* (2013.01); *F16C 19/06* (2013.01); *F16C 33/3806* (2013.01); *F16C 33/416* (2013.01)

(58) Field of Classification Search
CPC .. F16C 19/06; F16C 33/3806; F16C 33/3887; F16C 33/416
See application file for complete search history.

(56) References Cited

U.S. PATENT DOCUMENTS

| | | | | |
|---|---|---|---|---|
| 3,506,316 A | * | 4/1970 | McKee | F16C 33/416 384/516 |
| 4,534,871 A | * | 8/1985 | Johnson | F16C 33/6648 508/100 |
| 2014/0341492 A1 | | 11/2014 | Kamamoto et al. | |
| 2017/0023060 A1 | | 1/2017 | Kamamoto et al. | |
| 2017/0023062 A1 | | 1/2017 | Kamamoto et al. | |
| 2017/0204901 A1 | | 7/2017 | Kamamoto et al. | |
| 2017/0268570 A1 | | 9/2017 | Kamamoto et al. | |
| 2018/0223906 A1 | | 8/2018 | Kamamoto et al. | |

FOREIGN PATENT DOCUMENTS

| | | |
|---|---|---|
| JP | 2014-224592 A | 12/2014 |
| JP | 2017-026076 A | 2/2017 |
| JP | 2017-026081 A | 2/2017 |
| JP | 2017-129186 A | 7/2017 |
| JP | 2017-166532 A | 9/2017 |
| JP | 2018-128026 A | 8/2018 |

OTHER PUBLICATIONS

U.S. Appl. No. 17/086,574, filed Nov. 2, 2020 in the name of Yuya Yamamoto et al.
U.S. Appl. No. 17/086,773, filed Nov. 2, 2020 in the name of Shota Akimoto et al.

* cited by examiner

*Primary Examiner* — Phillip A Johnson
(74) *Attorney, Agent, or Firm* — Oliff PLC

(57) ABSTRACT

A rolling bearing includes: an inner ring; an outer ring; a plurality of balls provided between an inner ring raceway and an outer ring raceway; and an annular cage in which the balls are held at intervals in the circumferential direction of the cage. The cage includes an annular body, a plurality of first cage prongs, and a plurality of second cage prongs. A radially outer part of each of the first cage prongs includes a recessed portion. The recessed portion is constituted by a region surrounded by a first side wall surface, a second side wall surface, a bottom wall surface, and a third side wall surface.

4 Claims, 8 Drawing Sheets

ROLLING BEARING

CROSS-REFERENCE TO RELATED APPLICATION

This application claims priority to Japanese Patent Application No. 2020-071536 filed on Apr. 13, 2020, incorporated herein by reference in its entirety.

BACKGROUND

1. Technical Field

The present disclosure relates to a rolling bearing.

2. Description of Related Art

A rolling bearing includes an inner ring, an outer ring, a plurality of rolling elements provided between the inner ring and the outer ring, and an annular cage. In a case of a ball bearing the rolling elements of which are balls, a so-called snap cage made of resin is used in some cases. The snap cage includes an annular body placed closer to a first side in the axial direction than the rolling elements, and a plurality of cage prongs. The cage prongs are provided to extend to a second side in the axial direction from the annular body. Japanese Unexamined Patent Application Publication No. 2017-166532 (JP 2017-166532 A) describes a rolling bearing including a snap cage.

SUMMARY

The cage prongs provided in the snap cage are provided to extend to the second side in the axial direction from the annular body as described above, and thus, the cage prongs are formed in a cantilever manner. Particularly when the rolling bearing rotates at high speed, and the cage rotates accordingly, the cage prongs elastically deform radially outwardly under the influence of centrifugal force. When the cage prongs greatly deform, the cage prongs partially make contact with an inner peripheral surface of the outer ring or locally make contact with the rolling elements, for example. This might cause the cage to wear unevenly or might excessively increase the temperature of the rolling bearing. This adversely affects lubricant.

This disclosure can restrain deformation of a cage as much as possible, the deformation being caused due to centrifugal force generated by rotation of a rolling bearing.

An aspect of the present disclosure is a rolling bearing. The rolling bearing includes an inner ring, an outer ring, a plurality of balls, and an annular cage. The inner ring has an inner ring raceway on an outer peripheral side of the inner ring. The outer ring has an outer ring raceway on an inner peripheral side of the outer ring. The balls are provided between the inner ring raceway and the outer ring raceway. In the annular cage, the balls are held at intervals in the circumferential direction of the cage. The cage includes: an annular body placed closer to a first side in the axial direction of the cage than the balls; a plurality of first cage prongs provided to extend from a radially outer part of the annular body toward a second side in the axial direction; and a plurality of second cage prongs placed radially inwardly from the first cage prongs and provided to extend from a radially inner part of the annular body toward the second side in the axial direction. Pockets in which the balls are stored are each provided between the first cage prongs adjacent to each other in the circumferential direction. A radially outer part of each of the first cage prongs has an inclined shape directed radially inwardly toward the second side in the axial direction. The radially outer part includes a recessed portion opened radially outwardly and toward the second side in the axial direction. The recessed portion is constituted by a region surrounded by a first side wall surface, a second side wall surface, a bottom wall surface, and a third side wall surface, the first side wall surface being provided on a first side of the radially outer part in the circumferential direction so as to face a second side in the circumferential direction, the second side wall surface being provided on the second side of the radially outer part in the circumferential direction so as to face the first side in the circumferential direction, the bottom wall surface being provided between the first side wall surface and the second side wall surface, the third side wall surface being provided to rise radially outwardly from the first side of the bottom wall surface in the axial direction and to face the second side in the axial direction.

In the above configuration, the radially outer part of each of the first cage prongs provided in the cage has an inclined shape, and the recessed portion is formed in the radially outer part. Hereby, the first cage prongs are reduced in weight. This accordingly makes it possible to decrease centrifugal force to be applied to the first cage prongs at the time when the cage rotates, thereby making it possible to restrain the cage from deforming under the influence of the centrifugal force as much as possible.

In the rolling bearing, the annular body may have a toric shape. An outer peripheral surface of the annular body may be placed radially outwardly from the bottom wall surface and has a cylindrical shape around a cage center line. The third side wall surface may be a surface connecting the bottom wall surface to the outer peripheral surface of the annular body. With the above configuration, since the annular body does not include a recessed portion unlike the first cage prongs, the rigidity of the annular body is high, so that the deformation of the cage is restrained.

In the rolling bearing, each of the second cage prongs may include: a body portion provided to extend in the axial direction from a radially inner part of the annular body, and a projecting portion provided to project toward the inner ring raceway side from a part of the body portion on the second side in the axial direction, the projecting portion being configured to position the cage by making contact with the inner ring raceway. With such a configuration, the second cage prongs have a function as a guide portion configured to position the cage.

In the rolling bearing, the radially inner part of the annular body may include an inclined side face on the first side in the axial direction such that the radially inner part is reduced in thickness by the inclined side face. A radially inner end of the projecting portion may be placed radially inwardly from an outer peripheral surface of a shoulder portion provided on the first side of the inner ring in the axial direction. A virtual plane extending to the first side in the axial direction from a radially outer surface of the each of the second cage prongs intersects with a middle position of the inclined side face. In the configuration, it is necessary for the second cage prongs to climb over the shoulder portion provided on the first side of the inner ring in the axial direction, and the second cage prongs elastically deforms radially outwardly with the radially inner part of the annular body being as a starting point. Since the virtual plane intersects with the middle position of the inclined side face, even when the second cage prongs elastically deform as such, it is possible to prevent local stress from being generated in the radially inner part of the annular body.

With the above configuration, it is possible to restrain the cage from deforming under the influence of the centrifugal force as much as possible.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
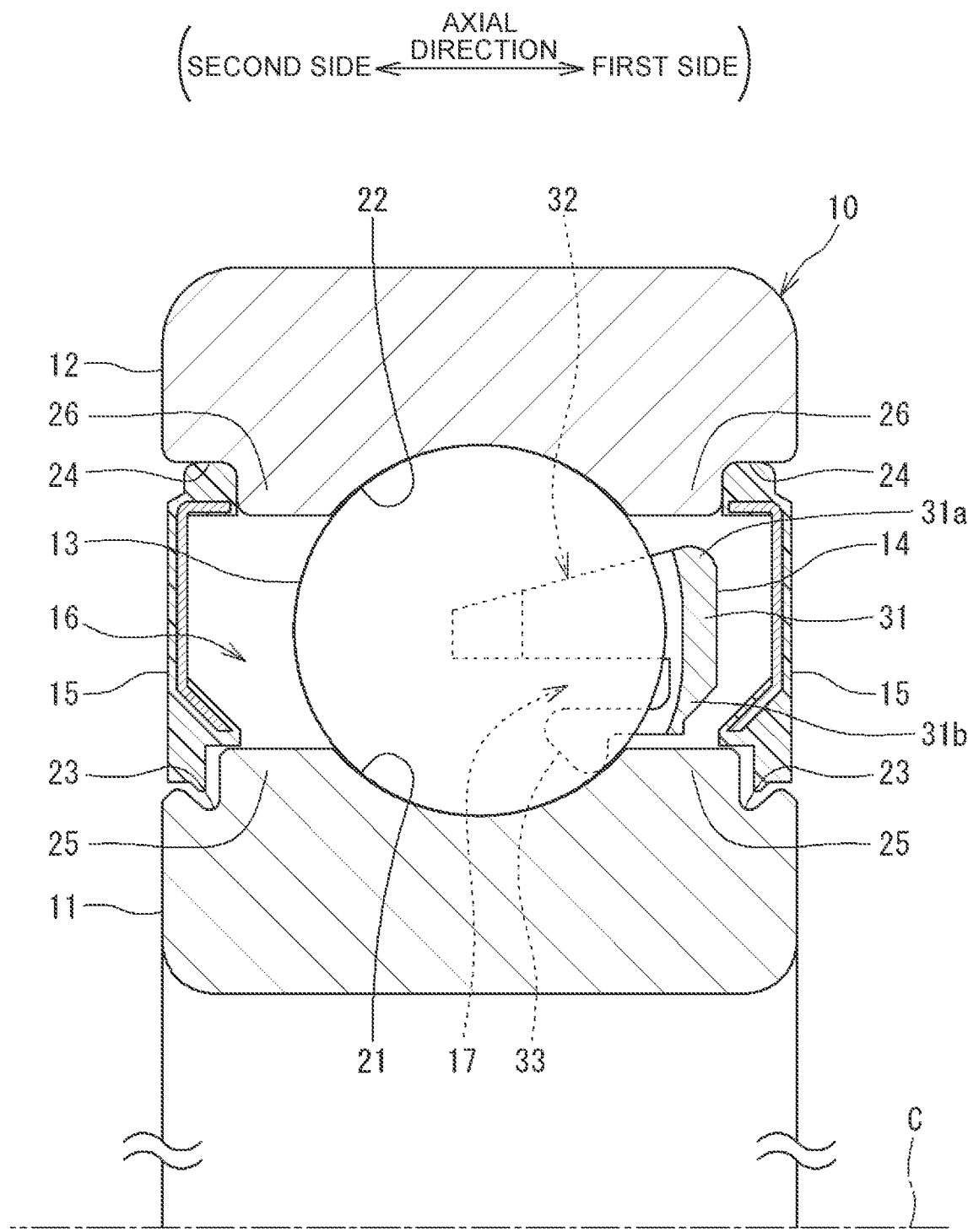
FIG. 1 is a sectional view of a rolling bearing.

FIG. 1 is a sectional view of a rolling bearing. The rolling bearing 10 illustrated in FIG. 1 includes an inner ring 11, an outer ring 12, a plurality of rolling elements provided between the inner ring 11 and the outer ring 12, and an annular cage 14. The rolling elements in this disclosure are balls 13, and the rolling bearing 10 is a ball bearing (deep groove ball bearing). The rolling bearing 10 is lubricated by lubricant. In this disclosure, grease is used as the lubricant though oil may be used. As the grease, channeling grease is preferable though churning grease may be used. FIG. 1 illustrates a section including a center line C (also referred to as a "bearing center line C") of the rolling bearing 10.

In this disclosure, an "axial direction," a "radial direction," and a "circumferential direction" used in descriptions about the inner ring 11, the outer ring 12, and the cage 14 are defined as follows. The "axial direction" is a direction along respective center lines of the inner ring 11, the outer ring 12, and the cage 14. Note that the axial direction also includes directions parallel to the center lines. The "radial direction" is a direction perpendicular to the respective center lines of the inner ring 11, the outer ring 12, and the cage 14. The "circumferential direction" is a direction along respective circles around the respective center lines of the inner ring 11, the outer ring 12, and the cage 14. In each of the figures, a reference sign "C" assigned to the respective center lines in a state where the respective center lines of the inner ring 11, the outer ring 12, and the cage 14 coincide with each other. The center line of the cage 14 is referred to as a "cage center line."

The rolling bearing 10 illustrated in FIG. 1 further includes seals 15 on the opposite sides in the axial direction. The seals 15 prevent grease in an annular space 16 (also referred to as "bearing inside") formed between the inner ring 11 and the outer ring 12 from leaking outside (bearing outside). Further, the seals 15 also have a function to prevent foreign matter in the bearing outside from entering the bearing inside.

The inner ring 11 is an annular member, and an inner ring raceway 21 with which the balls 13 make rolling contact is formed on an outer peripheral side of the inner ring 11. In the section illustrated in FIG. 1, the inner ring raceway 21 is constituted by a groove formed in a recessed arcuate shape having a radius slightly larger than the radius of the balls 13. Respective recessed grooves 23 are formed on respective outer peripheral surfaces of shoulder portions 25 formed on the opposite sides of the inner ring 11 in the axial direction. The recessed grooves 23 face respective inner peripheral portions of the seals 15 via respective gaps. Labyrinth gaps are formed by the gaps.

The outer ring 12 is an annular member, and an outer ring raceway 22 with which the balls 13 make rolling contact is formed on an inner peripheral side of the outer ring 12. In the section illustrated in FIG. 1, the outer ring raceway 22 is constituted by a groove formed in a recessed arcuate shape having a radius slightly larger than the radius of the balls 13. Respective sealing grooves 24 are formed on respective inner peripheral sides of shoulder portions 26 formed on the opposite sides of the outer ring 12 in the axial direction. Respective outer peripheral portions of the seals 15 are attached to the sealing grooves 24.

The balls 13 are provided between the inner ring raceway 21 and the outer ring raceway 22. When the rolling bearing 10 (the inner ring 11) rotates, the balls 13 roll on the inner ring raceway 21 and the outer ring raceway 22.

Figure 2:
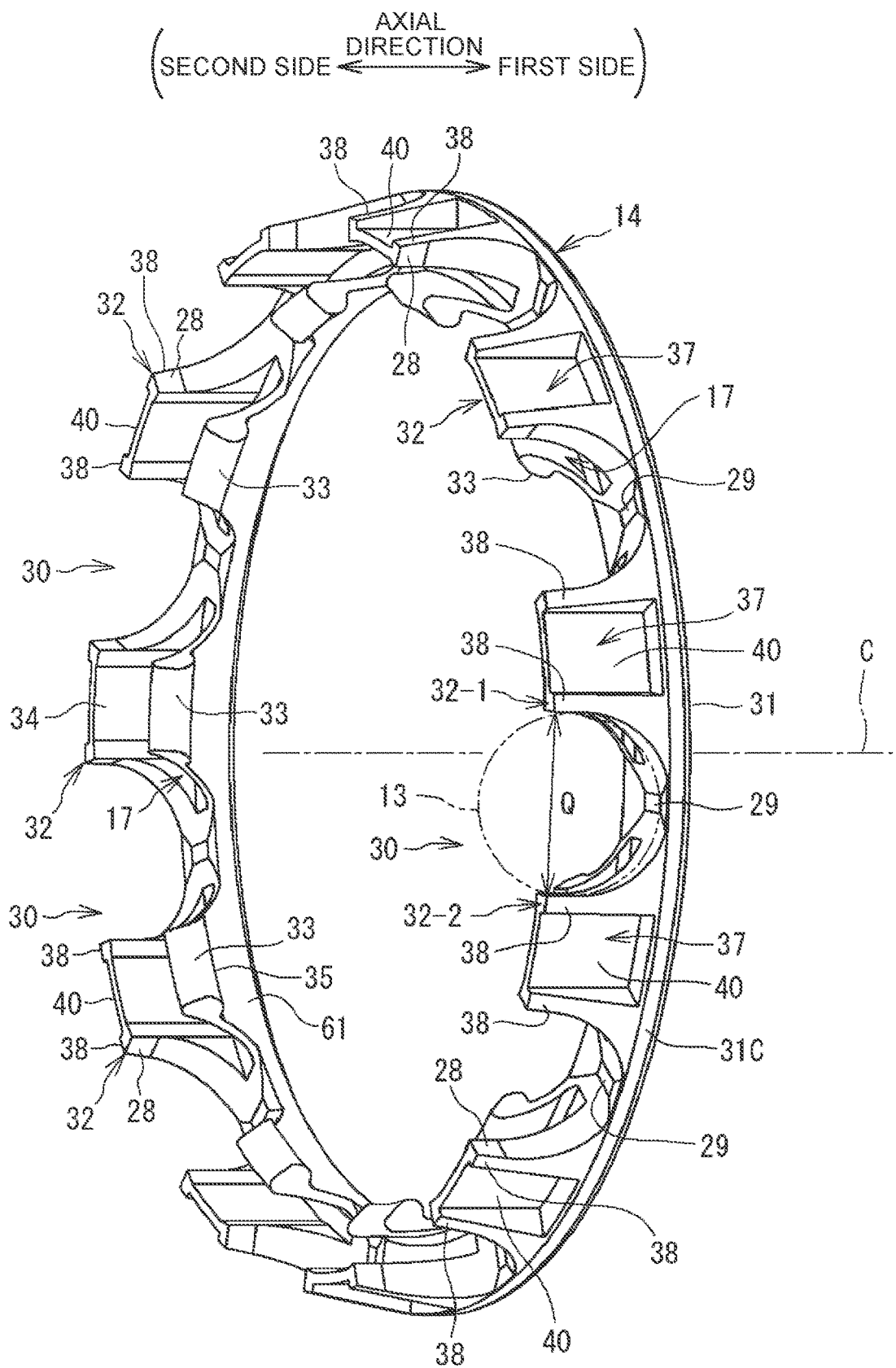
FIG. 2 is a perspective view of a cage.
Figure 3:
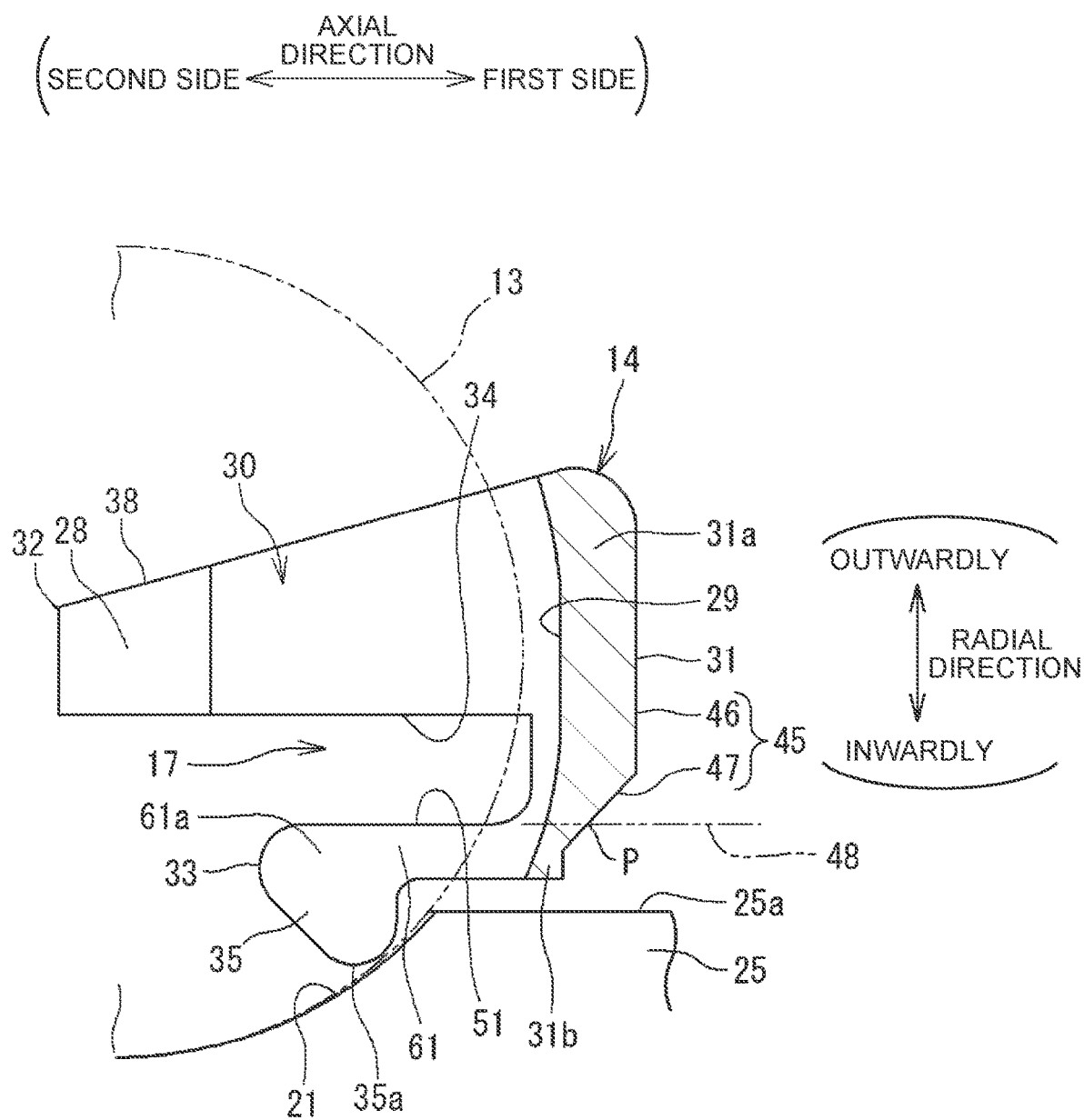
FIG. 3 is a sectional view illustrating the cage and its surrounding area.

FIG. 2 is a perspective view of the cage 14. FIG. 3 is a sectional view illustrating the cage 14 and its peripheral area. The cage 14 includes an annular body (annular portion) 31, a plurality of first cage prongs (first pillar portions) 32, and a plurality of second cage prongs (second pillar portions) 33. The annular body 31 is a part having an annular shape and is placed closer to a first side in the axial direction than the balls 13. All the first cage prongs 32 have the same shape. All the second cage prongs 33 have the same shape.

The first cage prongs 32 are provided to extend from a radially outer part 31a (see FIG. 3) of the annular body 31 toward a second side in the axial direction. A space between the first cage prongs 32 provided in a pair so as to be adjacent to each other in the circumferential direction, the space being formed closer to the second side in the axial direction than the annular body 31, serves as a pocket 30 in which the ball 13 is stored. A plurality of pockets 30 is formed along the circumferential direction.

The second cage prongs 33 are provided such that the second cage prongs 33 are placed radially inwardly from the first cage prongs 32 via a gap. The second cage prongs 33 are provided to extend from a radially inner part 31b of the annular body 31 toward the second side in the axial direction. A gap in the radial direction is provided between the first cage prongs 32 and the second cage prongs 33. The gap serves as a groove 17 that connects the pockets 30 provided in a pair so as to be adjacent to each other in the circumferential direction.

Hereby, the cage 14 can hold the balls 13 at intervals in the circumferential direction. The first cage prongs 32 each have a surface 28 facing the circumferential direction. The surface 28 is parallel to a virtual plane including the center line C and the center of the pocket 30, and two surfaces 28 facing each other across the pocket 30 are provided at the same distance from the virtual plane. The ball 13 can make contact with the surfaces 28. The annular body 31 has a surface 29 facing the second side in the axial direction. The surface 29 is a plane along a surface perpendicular to the bearing center line C. The ball 13 can make contact with the surface 29. The cage 14 is made of resin (synthetic resin)

such as polyamide, for example, and is manufactured by injection molding. The annular body 31 is formed integrally with the first cage prongs 32 and the second cage prongs 33, and the cage 14 is constituted by a single member.

The following further describes the second cage prong 33. The second cage prong 33 is provided to extend from the radially inner part 31b (see FIG. 3) of the annular body 31 toward the second side in the axial direction. The second cage prong 33 includes a body portion 61 and a projecting portion 35. The body portion 61 is provided to extend from the radially inner part 31b of the annular body 31 toward the second side in the axial direction. The projecting portion 35 is provided to project toward the inner ring raceway 21 side from a part 61a of the body portion 61 on the second side in the axial direction.

The projecting portion 35 can make contact with the inner ring raceway 21. When the projecting portion 35 makes contact with the inner ring raceway 21, the cage 14 is positioned. The following further describes the positioning of the cage 14. In a state where the center line of the cage 14 coincides with the center line of the inner ring 11 (in a state of FIG. 3), a gap is formed between the projecting portion 35 and the inner ring raceway 21. When the cage 14 is displaced in the radial direction from this state, the projecting portion 35 makes contact with the inner ring raceway 21 from the radial direction. Hereby, the displacement of the cage 14 in the radial direction is restricted. When the cage 14 is displaced to the first side in the axial direction from the state of FIG. 3, the projecting portion 35 makes contact with the inner ring raceway 21 from the axial direction. Hereby, the displacement of the cage 14 to the first side in the axial direction is restricted. Note that, when the cage 14 is displaced to the second side in the axial direction from the state of FIG. 3, the surface 29 of the annular body 31 makes contact with the ball 13. Hereby, the displacement of the cage 14 to the second side in the axial direction is restricted.

Thus, the second cage prong 33 has a function to restrict the movement of the cage 14 in the radial direction and in the axial direction. That is, the second cage prong 33 has a function as a guide portion configured to position the cage 14 by making contact with the inner ring raceway 21. When the second cage prong 33 makes contact (slide contact) with the inner ring raceway 21, the rotation of the cage 14 is guided. That is, the cage 14 in this disclosure serves as a raceway-guide cage (inner-ring-raceway guide cage).

The rolling bearing 10 (see FIG. 1) is assembled as follows. That is, the balls 13 are placed between the inner ring raceway 21 and the outer ring raceway 22, and the cage 14 is brought near to the balls 13 from the first side in the axial direction, so that the cage 14 is assembled to the balls 13. As illustrated in FIG. 3, a radially inner end 35a of the projecting portion 35 is placed radially inwardly from an outer peripheral surface 25a of the shoulder portion 25 of the inner ring 11 on the first side in the axial direction. On this account, at the time of assembling, it is necessary for the second cage prong 33 to climb over the shoulder portion 25. At this time, the second cage prong 33 elastically deforms radially outwardly with the radially inner part 31b of the annular body 31 being as a starting point. When the second cage prong 33 climbs over the shoulder portion 25, the second cage prong 33 returns to its original state due to an elastic restoring force, so that the projecting portion 35 is brought into a state where the projecting portion 35 can make contact with the inner ring raceway 21.

Figure 4:
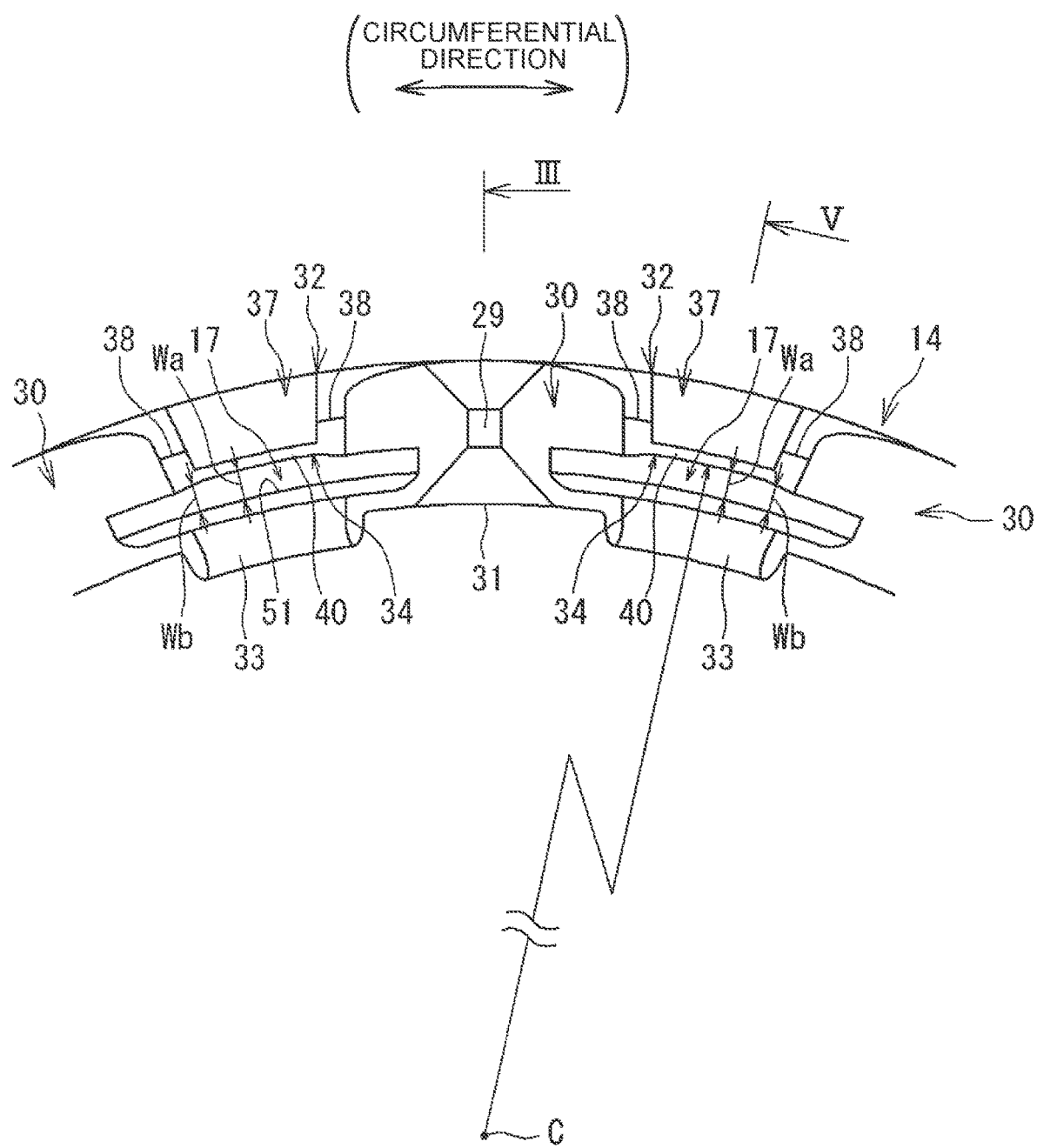
FIG. 4 is an enlarged view of part of the cage viewed from a second side in its axial direction.
Figure 5:
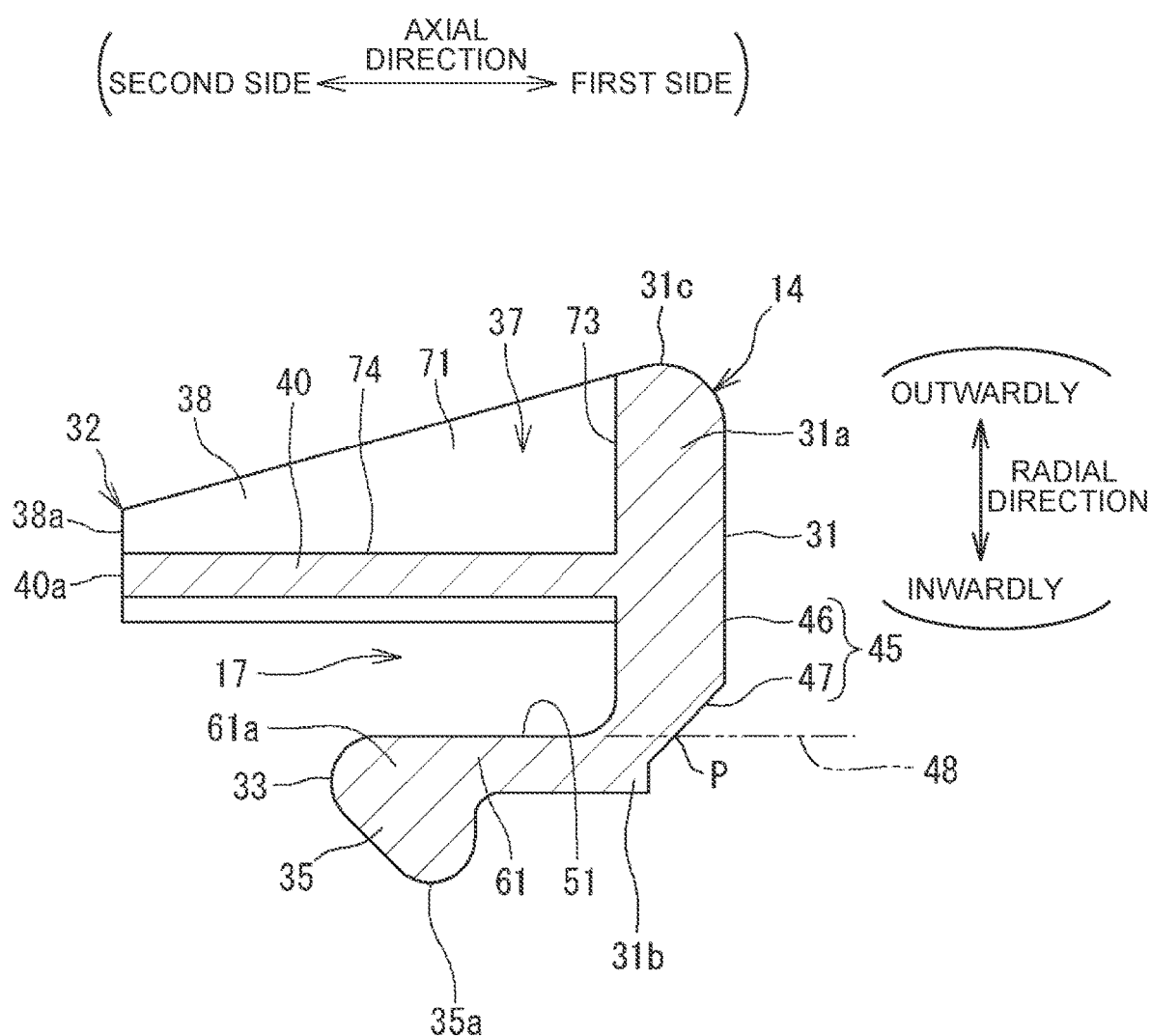
FIG. 5 is a sectional view taken along an arrow V in FIG. 4.
Figure 6:
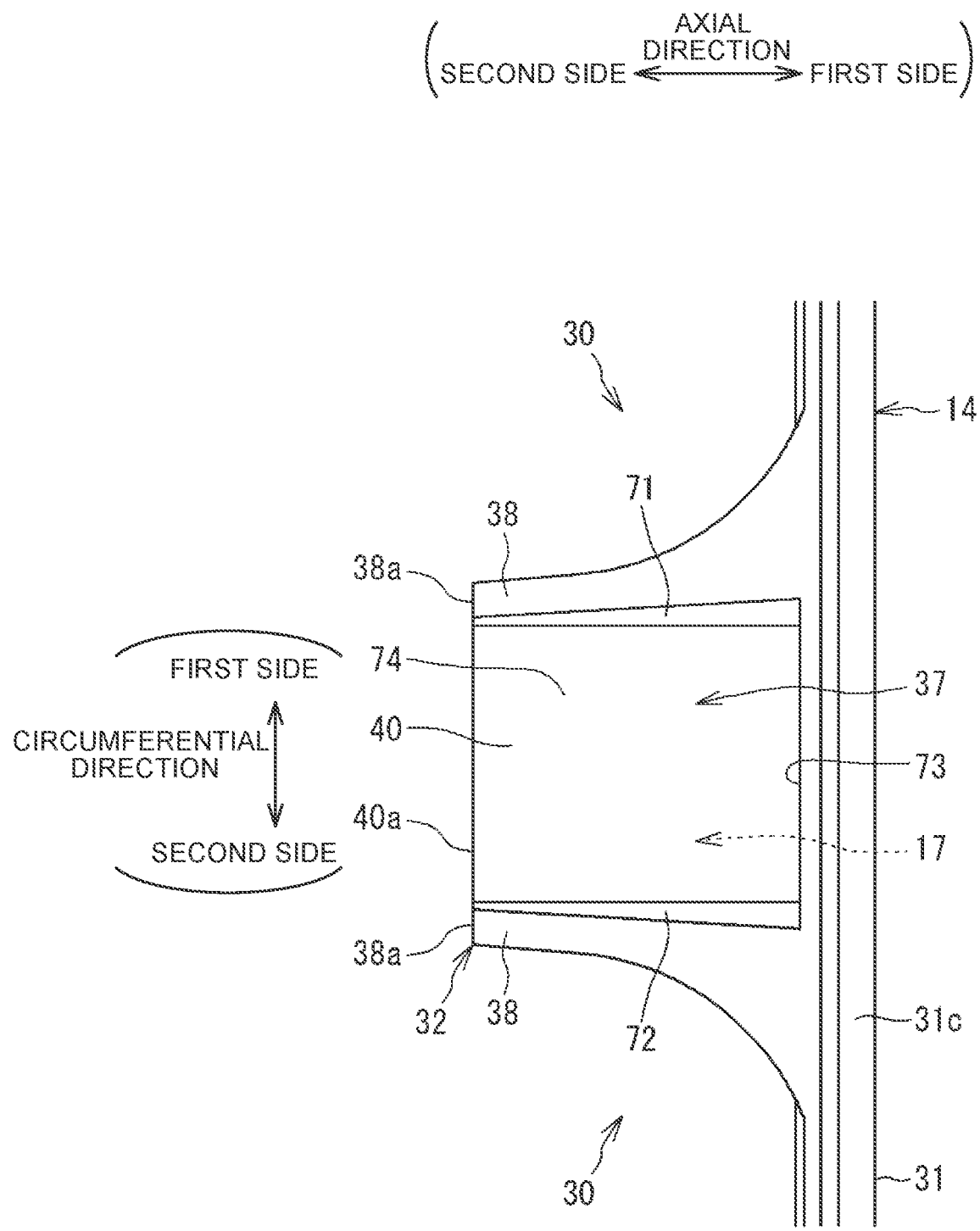
FIG. 6 is an enlarged view of part of the cage viewed from outside in its radial direction.

FIG. 4 is an enlarged view of part of the cage 14 viewed from the second side in the axial direction. FIG. 5 is a sectional view taken along an arrow V in FIG. 4. Note that FIG. 3 is a sectional view taken along an arrow III in FIG. 4. FIG. 6 is an enlarged view of part of the cage 14 viewed from outside in the radial direction. As illustrated in FIG. 5, a radially outer part of the first cage prong 32 has an inclined shape, as a whole, that is directed radially inwardly toward the second side in the axial direction. Further, as illustrated in FIGS. 4, 5, 6, the first cage prong 32 includes a recessed portion 37 in the radially outer part. The recessed portion 37 is provided from the first side to the second side in the axial direction in the radially outer part of the first cage prong 32 such that the recessed portion 37 is opened radially outwardly and toward the second side in the axial direction. Here, the cage 14 is made of resin and is manufactured by use of split metal dies. Since the recessed portion 37 is opened as such, the cage 14 is formable without being forcibly extracted from the split metal dies.

Since the recessed portion 37 is provided, the first cage prong 32 includes a pair of cage prong bodies 38 and a rib 40 provided between the cage prong bodies 38. The cage prong bodies 38 are provided on the opposite sides of the recessed portion 37 in the circumferential direction. The rib 40 has a plate shape having a radial dimension smaller than that of the cage prong body 38. As illustrated in FIGS. 4, 6, the rib 40 connects the annular body 31 to the cage prong bodies 38. The rib 40 is provided at a position closer to the inner side in the radial direction between the cage prong bodies 38 (see FIGS. 4, 5). As illustrated in FIG. 6, a side face 40a of the rib 40 on the second side in the axial direction and a side face 38a of the cage prong body 38 on the second side in the axial direction are present on the same plane. The plane is a plane perpendicular to the bearing center line C. The rib 40 covers the groove 17 from the outer side in the radial direction, so that grease in the groove 17 is hard to escape radially outwardly.

In FIGS. 5 and 6, the cage prong body 38 of the first cage prong 32 on a first side in the circumferential direction includes a first side wall surface 71. The first side wall surface 71 is a surface provided on the first side of the first cage prong 32 in the circumferential direction so as to face a second side in the circumferential direction. The cage prong body 38 of the first cage prong 32 on the second side in the circumferential direction includes a second side wall surface 72. The second side wall surface 72 is a surface provided on the second side of the first cage prong 32 in the circumferential direction so as to face the first side in the circumferential direction. The rib 40 includes a bottom wall surface 74 as a surface facing radially outwardly. The bottom wall surface 74 is a surface provided between the first side wall surface 71 and the second side wall surface 72. The radially outer part 31a of the annular body 31 includes a third side wall surface 73. The third side wall surface 73 is a surface provided to rise radially outwardly from the first side of the bottom wall surface 74 in the axial direction and to face the second side in the axial direction.

An outer peripheral surface 31c of the annular body 31 is positioned radially outwardly from the bottom wall surface 74. The third side wall surface 73 is a surface that connects the bottom wall surface 74 to the outer peripheral surface 31c of the annular body 31. The recessed portion 37 is constituted by a region surrounded by the first side wall surface 71, the second side wall surface 72, the bottom wall surface 74, and the third side wall surface 73.

Figure 7:
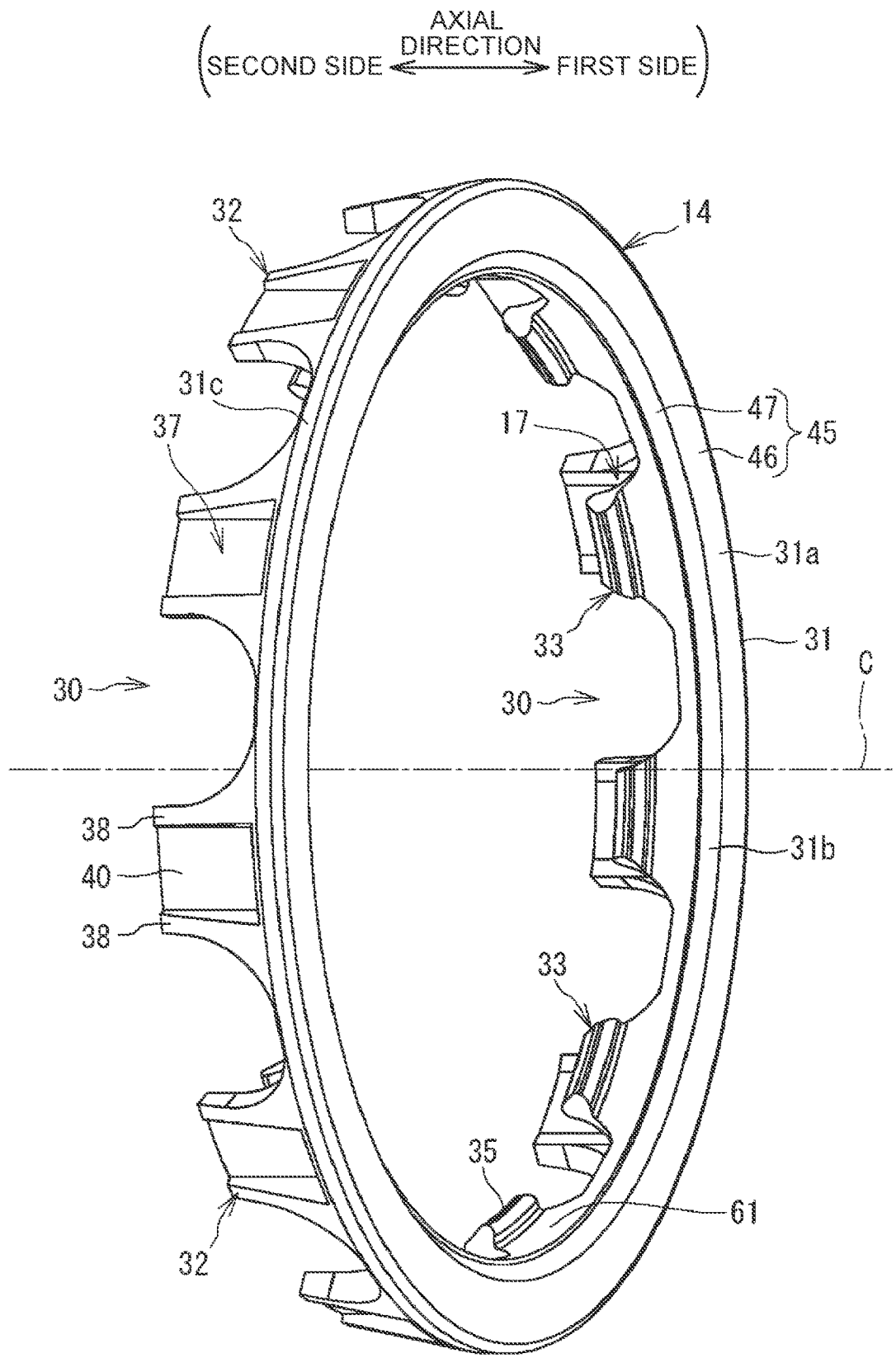
FIG. 7 is a perspective view of the cage viewed from a first side in the axial direction.

FIG. 7 is a perspective view of the cage 14 viewed from the first side in the axial direction. As illustrated in FIGS. 2, 7, the annular body 31 has a toric shape. The outer peripheral surface 31c of the annular body 31 has a cylindrical shape without projection and recess around the center line C (the cage center line). As illustrated in FIGS. 3, 5, and 7, a side face 45 of the annular body 31 on the first side in the axial direction includes a toric side face 46 provided continuously in the circumferential direction, and an inclined side face 47 provided continuously in the circumferential direction. The inclined side face 47 is a tapered surface having an inside diameter decreasing toward the second side in the axial direction. The toric side face 46 and the inclined side face 47 do not have a recessed portion. That is, the annular body 31 has a solid structure without being provided with a recessed portion in any part of the annular body 31 (the annular body 31 is not hollow in any part).

As illustrated in FIG. 4, the groove 17 connects the pockets 30 provided in a pair so as to be adjacent to each other in the circumferential direction. The groove 17 is a recessed groove in which grease (lubricant) can be present. The groove 17 is constituted by a space surrounded by the first cage prong 32 and the second cage prong 33 in the radial direction. The groove 17 is opened to the second side in the axial direction, and the first side of the groove 17 in the axial direction is closed by the annular body 31. The first cage prong 32 constitutes a radially outer wall of the groove 17. The second cage prong 33 constitutes a radially inner wall of the groove 17.

In this disclosure, the groove width of the groove 17 is increased in the radial direction at the center of the groove 17 in the circumferential direction. In FIG. 4, the dimension of the groove width at the center of the groove 17 in the circumferential direction is "Wa," and the dimension of the groove width on each side of the groove 17 in the circumferential direction is "Wb." The groove width satisfies Wa>Wb. Thus, a radially inner face 34 of the first cage prong 32 has a shape recessed at the center of the radially inner face 34 in the circumferential direction, and the groove 17 has a shape the groove width of which is increased in the radial direction at the center of the groove 17 in the circumferential direction.

Now, focus on the first cage prongs 32 provided on the opposite sides in the circumferential direction across one pocket 30 in which the ball 13 is stored in FIG. 2. One of the first cage prongs 32 is referred to as a primary first cage prong 32-1, and the other one of them is referred to as a secondary first cage prong 32-2. A distance Q between respective distal ends, on the second side in the axial direction, of the first cage prongs 32-1, 32-2 provided in a pair so as to be adjacent to each other in the circumferential direction is larger than the diameter of the ball 13.

Accordingly, when the cage 14 is to be displaced to the first side in the axial direction, the displacement of the cage 14 is not restricted by the ball 13. Here, the second cage prong 33 of the cage 14 can make contact with the inner ring raceway 21 from the axial direction, as described above (see FIG. 1). On this account, the cage 14 does not fall off from between the inner ring 11 and the outer ring 12.

Note that, in a case of a general deep groove ball bearing, a so-called snap cage is used. The snap cage includes a detent portion on a distal end side of a cage prong, and the distance between detent portions of cage prongs provided in a pair so as to be adjacent to each other in the circumferential direction is smaller than the diameter of a ball. In this configuration, an axial movement of the snap cage is restricted by the ball, so that the cage does not fall off from between an inner ring and an outer ring. Differently from such a snap cage, the cage 14 in this disclosure is not provided with the detent portions the distance between which is smaller than the diameter of the ball, the detent portions being provided in the general snap cage. Since the detent portions are not provided, the first cage prongs 32 can be shortened in the cage 14 in this disclosure, so that the cage 14 is reduced in weight.

As described above, the cage 14 provided in the rolling bearing 10 in this disclosure includes the annular body 31, the first cage prongs 32, and the second cage prongs 33. The first cage prongs 32 are provided to extend from the radially outer part 31a of the annular body 31 toward the second side in the axial direction. The second cage prongs 33 are provided to extend from the radially inner part 31b of the annular body 31 toward the second side in the axial direction. The radially outer part of the first cage prong 32 has an inclined shape directed radially inwardly toward the second side in the axial direction, and the recessed portion 37 is formed in the radially outer part of the first cage prong 32.

Since the radially outer part of the first cage prong 32 has an inclination shape, and the recessed portion 37 is formed in the radially outer part as such, the first cage prong 32 is reduced in weight. This makes it possible to decrease centrifugal force to be applied to the first cage prong 32 at the time when the cage 14 rotates, thereby making it possible to restrain the cage 14 from deforming under the influence of the centrifugal force as much as possible. This accordingly makes it possible to prevent the first cage prong 32 from partially making contact with part of the inner peripheral surface of the outer ring 12 or locally making contact with the ball 13. As a result, it is possible to prevent the cage 14 from wearing unevenly or the temperature of the rolling bearing 10 from increasing excessively.

Further, in the rolling bearing 10 in this disclosure, the annular body 31 of the cage 14 has a toric shape, and the outer peripheral surface 31c of the annular body 31 has a cylindrical shape without projection and recess around the center line C. That is, since the annular body 31 does not include the recessed portion 37 unlike the first cage prong 32, the rigidity of the annular body 31 is high, so that the deformation of the cage 14 is restrained. Further, as described above (see FIG. 7), no recessed portion is formed on the side face 45 (the toric side face 46 and the inclined side face 47) of the annular body 31 on the first side in the axial direction. That is, the annular body 31 has a solid structure. On this account, the rigidity of the annular body 31 is high, so that the deformation of the cage 14 is further restrained.

Since the rotation of the cage 14 is guided by the inner ring 11, the cage 14 is placed closer to the inner ring 11. This makes it possible to decrease the outside diameter of the cage 14. The centrifugal force is decreased as any of the mass of the cage 14, the angular velocity thereof, and the distance (radius) thereof from the rotation center is reduced. Accordingly, in the cage 14 in this disclosure, since the cage 14 is placed closer to the inner ring 11, the centrifugal force to be applied to the cage 14 can be further decreased.

When the rolling bearing 10 (the inner ring 11) rotates at high speed, the grease present in the inner ring raceway 21 is to move to the outer ring 12 side by centrifugal force. However, in this disclosure, the grease is received by the first cage prong 32, and the grease is gathered in the groove 17 between the first cage prong 32 and the second cage prong 33. Particularly, in this disclosure, channeling grease is used as the lubricant, and therefore, the grease is easily gathered in the groove 17.

Figure 8:
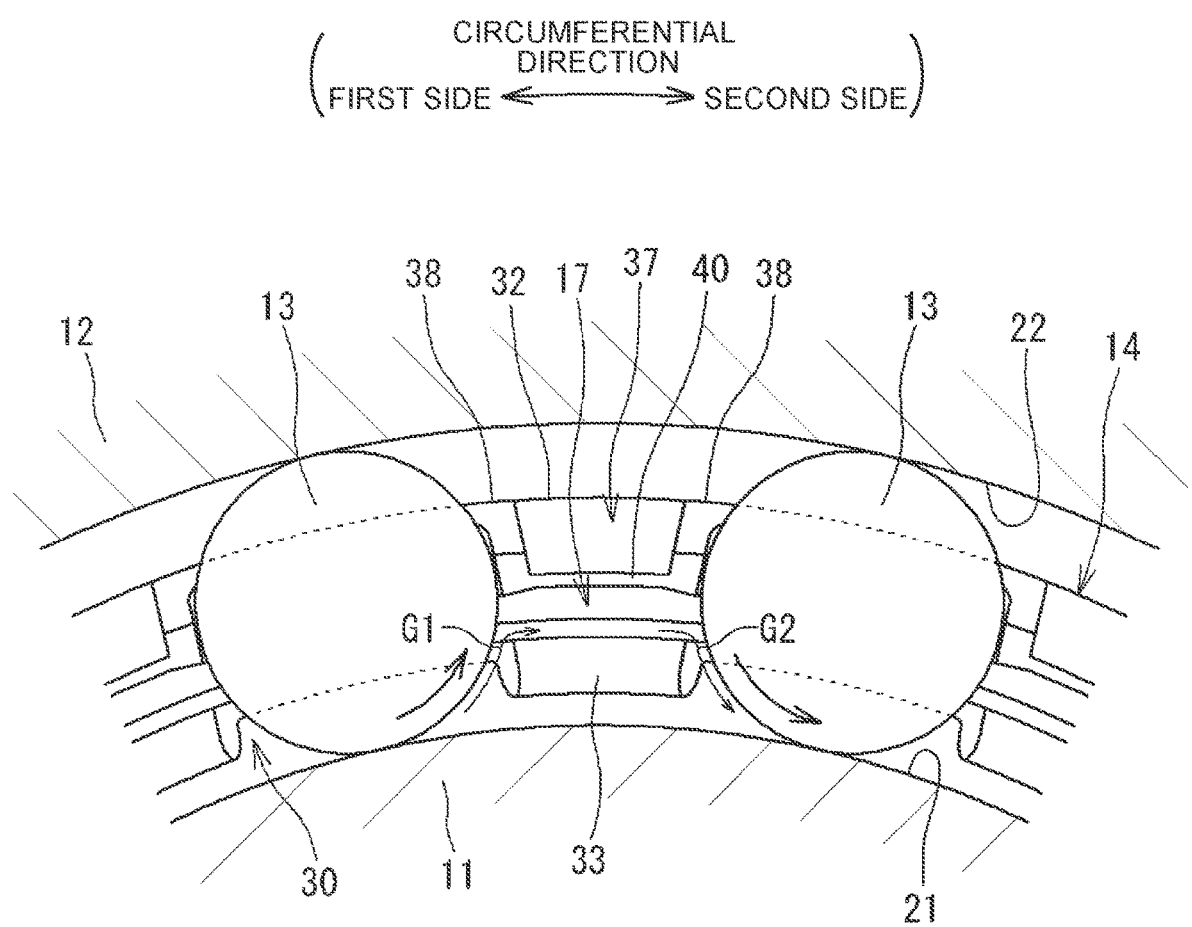
FIG. 8 is a view to describe the flow of grease.

FIG. 8 is a view to describe the flow of the grease (base oil of the grease). When the outer ring 12 is in a resting state and the inner ring 11 rotates clockwise (to the second side in the circumferential direction), the balls 13 revolve along the inner ring raceway 21 and the outer ring raceway 22 while the balls 13 rotate on their axes. Hereby, the grease present on the inner ring 11 side enters the groove 17 from the ball 13 and the pocket 30 on the first side (the left side in FIG. 8) in the circumferential direction. The movement of the grease is indicated by an arrow G1.

The grease thus entering the groove 17 stays in the groove 17. The base oil of the grease flows through the groove 17 and is supplied to the second side (the right side in FIG. 8) of the groove 17 in the circumferential direction, for example, so that the grease is attached onto the surface of the ball 13 on the second side in the circumferential direction. Due to rotation of the ball 13 on the second side in the circumferential direction, the base oil thus attached to the surface of the ball 13 moves to the inner ring raceway 21 side. The movement of the base oil is indicated by an arrow G2. When the base oil of the grease is supplied from the groove 17 to the inner ring 11 side via the ball 13, it is possible to restrain insufficiency in lubricant on the inner ring 11 side. As a result, it is possible to achieve a longer operating life of the rolling bearing 10. Particularly, the rolling bearing 10 (the cage 14) in this disclosure is suitable for high speed rotation.

As described above (see FIG. 1), at the time of assembling of the rolling bearing 10, the balls 13 are placed between the inner ring raceway 21 and the outer ring raceway 22, and the cage 14 is brought near to the balls 13 from the first side in the axial direction, so that the cage 14 is assembled to the balls 13. At the time of assembling, the second cage prongs 33 elastically deform radially outwardly with the radially inner part 31b of the annular body 31 being as a starting point so that the second cage prongs 33 climb over the shoulder portion 25. As illustrated in FIGS. 3, 5, the radially inner part 31b of the annular body 31 includes the inclined side face 47 on the first side in the axial direction. Due to the inclined side face 47, the radially inner part 31b is reduced in thickness. Because of this, the second cage prongs 33 provided to extend from the radially inner part 31b easily elastically deform, so that the cage 14 is easily assembled to the balls 13.

Further, in this disclosure, a virtual plane 48 extending to the first side in the axial direction from a radially outer surface 51 of the second cage prong 33 intersects with a middle position P of the inclined side face 47. Since the virtual plane 48 intersects with the middle position P of the inclined side face 47, even when the second cage prong 33 elastically deforms radially outwardly at the time of assembling the rolling bearing 10, it is possible to prevent local stress from being generated in the radially inner part 31b of the annular body 31. Note that, when local stress is applied to the radially inner part 31b of the annular body 31, defects are caused, e.g., part (the radially inner part 31b) of the cage 14 made of resin causes blushing or deforms plastically. However, with the cage 14 according this disclosure, such defects can be prevented.

The embodiment described herein is just an example in all respects and is not limitative. The scope of the present disclosure is not limited to the above embodiment and includes all modifications made within a range equivalent to the configurations described in the scope of Claims. The above embodiment deals with a case where the rolling bearing is a deep groove ball bearing, but the rolling bearing may be an angular contact ball bearing

What is claimed is:

1. A rolling bearing comprising:
an inner ring having an inner ring raceway on an outer peripheral side of the inner ring;
an outer ring having an outer ring raceway on an inner peripheral side of the outer ring;
a plurality of balls provided between the inner ring raceway and the outer ring raceway; and
an annular cage in which the balls are held at intervals in a circumferential direction of the cage, wherein:
the cage includes
an annular body placed closer to a first side in an axial direction of the cage than the balls,
a plurality of first cage prongs provided to extend from a radially outer part of the annular body toward a second side in the axial direction, and
a plurality of second cage prongs placed radially inwardly from the first cage prongs and provided to extend from a radially inner part of the annular body toward the second side in the axial direction;
pockets in which the balls are stored are each provided between the first cage prongs adjacent to each other in the circumferential direction;
a radially outer part of each of the first cage prongs has an inclined shape directed radially inwardly toward the second side in the axial direction;
the radially outer part includes a recessed portion opened radially outwardly and toward the second side in the axial direction; and
the recessed portion is constituted by a region surrounded by a first side wall surface, a second side wall surface, a bottom wall surface, and a third side wall surface, the first side wall surface being provided on a first side of the radially outer part in the circumferential direction so as to face a second side in the circumferential direction, the second side wall surface being provided on the second side of the radially outer part in the circumferential direction so as to face the first side in the circumferential direction, the bottom wall surface being provided between the first side wall surface and the second side wall surface, the third side wall surface being provided to rise radially outwardly from the first side of the bottom wall surface in the axial direction and to face the second side in the axial direction.

2. The rolling bearing according to claim 1, wherein:
the annular body has a toric shape;
an outer peripheral surface of the annular body is placed radially outwardly from the bottom wall surface and has a cylindrical shape around a cage center line; and
the third side wall surface is a surface connecting the bottom wall surface to the outer peripheral surface of the annular body.

3. The rolling bearing according to claim 1, wherein each of the second cage prongs includes
a body portion provided to extend in the axial direction from a radially inner part of the annular body, and
a projecting portion provided to project toward the inner ring raceway side from a part of the body portion on the second side in the axial direction, the projecting portion being configured to position the cage by making contact with the inner ring raceway.

4. The rolling bearing according to claim 3, wherein:
the radially inner part of the annular body includes an inclined side face on the first side in the axial direction such that the radially inner part is reduced in thickness by the inclined side face;
a radially inner end of the projecting portion is placed radially inwardly from an outer peripheral surface of a shoulder portion provided on the first side of the inner ring in the axial direction; and a virtual plane extending to the first side in the axial direction from a radially outer surface of the each of the second cage prongs intersects with a middle position of the inclined side face.

\* \* \* \* \*